US006978130B2

(12) United States Patent
Nagata

(10) Patent No.: US 6,978,130 B2
(45) Date of Patent: Dec. 20, 2005

(54) METHOD FOR CHANGING VOICE CODING MODE, COMMUNICATION SYSTEM, COMMUNICATION NETWORK AND COMMUNICATION TERMINAL

(75) Inventor: Yoshinori Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 412 days.

(21) Appl. No.: 10/400,238

(22) Filed: Mar. 27, 2003

(65) Prior Publication Data

US 2004/0203448 A1 Oct. 14, 2004

(30) Foreign Application Priority Data

Mar. 28, 2002 (JP) ............................ 2002-092001

(51) Int. Cl.$^{7}$ .......................... H04Q 7/20; H04M 1/00; H04B 17/00

(52) U.S. Cl. ................. 455/422.1; 455/560; 455/67.11

(58) Field of Search ............................ 455/426.1, 419, 455/418, 67.11, 550.1, 560, 561, 422.1; 370/328, 370/352, 401, 465, 466, 468; 704/201, 500

(56) References Cited

U.S. PATENT DOCUMENTS

| | | | | |
|---|---|---|---|---|
| 5,513,211 | A * | 4/1996 | Yabusaki et al. | 375/219 |
| 6,108,560 | A * | 8/2000 | Navaro et al. | 455/517 |
| 6,215,996 | B1 * | 4/2001 | Fujita | 455/422.1 |
| 6,256,612 | B1 * | 7/2001 | Vo et al. | 704/500 |
| 6,751,477 | B1 * | 6/2004 | Alperovich et al. | 455/560 |
| 6,847,636 | B1 * | 1/2005 | Choi | 370/352 |
| 2002/0029142 | A1 | 3/2002 | Koo | |
| 2002/0093911 | A1 * | 7/2002 | Yotsui | 370/229 |
| 2004/0098251 | A1 * | 5/2004 | Valinio et al. | 704/201 |

FOREIGN PATENT DOCUMENTS

| | | |
|---|---|---|
| WO | WO 99/20021 | 4/1999 |
| WO | WO 01/78430 A1 | 10/2001 |

OTHER PUBLICATIONS

Stefan Bruhn, et al.; "Concepts and Solutions for Link Adaption and Inband Signaling for the GSM AMR Speech Coding Standard"; Vehicular Technology Conference, 1999 IEEE 49th Houston, TX, USA, May 16-20, 1999, Piscataway, NJ, USA, IEEE, US, May 16, 1999, pp. 2451-2455, XP010342317.

* cited by examiner

*Primary Examiner*—Nick Corsaro
*Assistant Examiner*—Raymond B. Persino
(74) *Attorney, Agent, or Firm*—Muirhead and Saturnelli, LLC

(57) ABSTRACT

The invention provides a method, a communication system, a communication network, a communication apparatus and a communication terminal enabling the voice coding mode during voice communication to be changed by a common operation independently of diverse network configurations.

A first network monitors the communication situation including quality of a radio link during voice communication of a first terminal, and determines an appropriate coding mode based on the communication situation. In addition, the first network sends to the first terminal a first request for change to the appropriate coding mode. Upon reception of the first request, the first terminal sends a second request for change of the coding mode to a second network. Upon reception of the second request, the second network changes the coding mode of the voice codec given to a second terminal engaged in voice communication with the first terminal, and sends back to the first terminal a response to the second request. The first terminal, which receives the response to the second request, sends back to the first network a response to the first request.

11 Claims, 6 Drawing Sheets

METHOD FOR CHANGING VOICE CODING MODE, COMMUNICATION SYSTEM, COMMUNICATION NETWORK AND COMMUNICATION TERMINAL

BACKGROUND OF THE INVENTION

1. Field of the Invention

The present invention relates to a mobile communication system, and more particularly, to voice communication in the mobile communication system.

2. Description of the Related Art

FIG. 5 shows a configuration of a conventional general communication system. Referring to FIG. 5, a mobile network 51 is interconnected with a fixed network 52 via a gateway (not shown).

The mobile network 51 is a mobile communication system constituted by a plurality of types of apparatuses including base stations and connected with mobile terminals 53 via radio links. The mobile communication system may have a variety of configurations. A signal is sent and received with a radio wave between the base station and the mobile terminal 53. The fixed network 52 is, for example, PSTN (public switched telephone network) or ISDN (integrated services digital network), and is connected with fixed telephones 54.

In a mobile communication system, frequency usage efficiency is improved wherever possible in order to achieve communications at mobile terminals of many users with a finite radio frequency resource. In a digital mobile communication system in which a voice is transmitted with a digital signal, a required frequency band can be narrowed if the transmission rate of each voice communication is reduced. Therefore, in the digital mobile communication system, it is desirable that each voice communication is coded in a mode of low transmission rate for improving the frequency usage efficiency. On the other hand, since voice quality is compromised if the transmission rate is reduced, the transmission rate may be increased for improving the voice quality when speech channels are not congested. Thus, if the transmission rate of each voice communication can be selected according to the degree of congestion, the frequency usage efficiency can be improved while the speech quality can be ensured at the same time.

In addition, in a mobile communication system, the quality of communication is generally degraded when the speed at which a mobile terminal moves is increased. Thus, it is desirable that the transmission rate of voice communication can adaptively be changed after the voice communication is started.

For this purpose, some conventional mobile communication systems employ an AMR (Adaptive Multi-Rate Codec) mode. In the AMR mode, the mobile communication system and the mobile terminal can use voice coding modes of a plurality of transmission rates, the network side of the mobile communication system and the mobile terminal determine the transmission rate by negotiation at the time when voice communication is started, and the transmission rate is changed to an appropriate rate according to the communication quality during voice communication.

A general procedure in which the mobile communication system employing the AMR mode changes the transmission rate during voice communication will be described.

First, an apparatus monitoring the quality of radio communication on the network side of the mobile communication system (hereinafter referred to as monitoring apparatus) determines whether or not the transmission rate should be changed according to the quality. If determining that the transmission rate should be changed, the monitoring apparatus instructs the mobile terminal to change the uplink transmission rate. The mobile terminal changes to an indicated rate the transmission rate at which signals are sent in the uplink.

The monitoring apparatus then instructs an apparatus having a voice codec (CODEC: Coder/Decoder) on the network side of the mobile communication system (hereinafter referred to as switching apparatus) to change the downlink transmission rate. When the switching apparatus changes the downlink transmission rate, the procedure of changing the transmission rate is completed.

For one example of control of the transmission rate, the transmission rate is increased when the quality of radio communication is degraded, and the transmission rate is decreased when speech channels are congested.

The IMT-2000 (International Mobile Telecommunications-2000) system that was made available in 2001 in Japan and the GSM (Global Systems for Mobile communications) system operated mainly in Europe employ the AMR mode.

FIG. 6 is a sequence diagram showing a procedure for changing the transmission rate in the IMT-2000 system. In the IMT-2000 system, a CN (Core Network) constituted by a plurality of MSCs (Mobile services Switching Centers), a RNC (Radio Network Controller) connected to MSC and UE (User Equipment) send and receive control signals, whereby the transmission rate is controlled. The MSC is an exchange constituting the mobile communication system. Since the MSC has a voice codec, it is equivalent to the above described switching apparatus, and switches between the voice coding mode of the mobile communication system and the PCM (pulse code modulation) that is used in PSTN or the like. The RNC is connected to a plurality of base stations, and controls the base stations and radio links. The RNC is equivalent to the above described monitoring apparatus. The UE is a terminal of a cellular phone or the like, and has a voice codec.

For the procedure of changing the transmission rate, the RNC sends to the UE a control signal providing an instruction to change the uplink transmission rate [RATE CONTROL FOR UPLINK] when the RNC determines that the transmission rate should be changed based on the quality of radio communication.

Upon reception of the instruction to change the uplink transmission rate, the UE starts sending a voice signal as user data at the indicated transmission rate.

Then, the RNC sends to a predetermined MSC of the CN a control signal providing an instruction to change the downlink transmission rate [RATE CONTROL FOR DOWNLINK].

Upon reception of the instruction to change the downlink transmission rate, the MSC starts sending a voice signal as user data at the indicated transmission rate.

FIG. 7 is a sequence diagram showing a procedure for changing the transmission rate in the GSM system. In the GSM system, a TRAU (Transcoder Rate Adaptation Unit), a BTS (Base Transceiver Station) and UE (User Equipment) send and receive control signals, where by the transmission rate is controlled. The TRAU is provided between a BSC (Base Station Controller) controlling the BTS and the BTS, and switches between the voice coding mode of the mobile communication system and the PCM. The TRAU is equivalent to the above described switching apparatus. The BSC is connected to a CN (Cellular Network) or PSTN. The BTS is a base station for carrying out radio communication with the UE, and is equivalent to the above described monitoring apparatus. The UE is a terminal of a cellular phone or the like, and has a voice codec.

For the procedure of changing the transmission rate, the BTS sends to the UE a control signal providing an instruction to change the uplink transmission rate [RATE CONTROL FOR UPLINK] when the BTS determines that the transmission rate should be changed based on the quality of radio communication.

When instructed to change the uplink transmission rate, the UE starts sending a voice signal as user data at the indicated transmission rate.

Then, the BTS sends to the BSC a control signal providing an instruction to change the downlink transmission rate [RATE CONTROL FOR DOWNLINK].

When instructed to change the downlink transmission rate, the BSC starts sending a voice signal as user data at the indicated transmission rate.

In the GSM system and IMT-2000 system, the transmission rate is adaptively controlled according to the quality of radio communication and the degree of congestion of the speech channels, thus making it possible to perform satisfactory communication.

The conventional mobile communication system such as the GSM system and IMT-2000 system includes an apparatus having a voice codec, and a voice signal passing through a gateway is of PCM when a mobile terminal makes voice communication with the terminal of a fixed network such as PSTN and ISDN. The protocol for controlling the transmission rate of the mobile communication system is terminated in the mobile communication system.

In recent years, on the other hand, the IP telephone for making voice communication by using a terminal connected to the IP network has been spread more and more. The IP network accommodates the terminal of the personal computer or the like by the Internet protocol, and is interconnected with the mobile network and the fixed network.

In the IP telephone, a voice coding mode for use in the fixed telephone such as the PCM or ADPCM (adaptive differential PCM) may be used, but it is desirable that a voice coding mode of low transmission rate is used as in the case of mobile communication from a viewpoint of accommodation efficiency in speech channel.

If the IP telephone and the mobile communication system individually select (band-compressed) voice coding modes of low transmission rate to achieve voice communication between the mobile terminal and the IP telephone terminal, band compression and extension occurs twice for the voice signal in the mobile communication system and the IP network, resulting in degradation of voice quality. Thus, if the mobile terminal having a voice codec and an apparatus having a voice codec in the IP network directly send and receive a coded voice signal, the band compression and extension occurs only once, and therefore the degradation of voice quality is alleviated.

In this case, however, the apparatus controlling the voice coding mode of the mobile communication system does not have a protocol for exchanging control signals for changing the voice coding mode between itself and the apparatus in the IP network, and therefore the voice coding mode cannot be changed during voice communication. In order that the mobile communication system and the IP network change the voice coding mode in connection with each other, a control protocol for controlling the voice coding mode may be defined between the apparatus controlling the voice coding mode of the mobile communication system and the apparatus in the IP network. However, it can be considered that there exist a variety of mobile communication systems having different configurations such as the GSM system and the IMT-2000 system. Thus, the apparatus in the IP network should operate in a different way for each mobile communication system because its partner to which the control signal is sent and from which the control signal is received for controlling the voice coding mode is different for each mobile communication system.

If a mobile communication system having further diverse configurations appears hereafter, additional processing should be applied to the apparatus in the IP network, or an apparatus should be added to the IP network on each such occasion, thus raising development and equipment costs.

SUMMARY OF THE INVENTION

The object of the present invention is to provide a method, a communication system, a communication network, a communication apparatus and a communication terminal enabling the voice coding mode during voice communication to be changed by a common operation without depending on diverse network configurations.

For achieving the above object, the method for changing a voice coding mode according to the present invention is a method for changing a voice coding mode in a communication system including first and second networks interconnected with each other, at least one first terminal having a voice codec allowing any coding mode to be selected from a plurality of coding modes, and connected to the above described first network by a radio link, and at least one second terminal connected to the above described second network and given by the above described second network a voice codec allowing any voice coding mode to be selected from a plurality of voice coding modes to communicate with the above described first terminal, comprising the steps for:

in the above described first network, monitoring the communication situation including quality of the radio link during voice communication of the above described first terminal;

determining an appropriate coding mode based on the above described communication situation; and sending to the above described first terminal a first request for change to the above described appropriate coding mode;

in the above described first terminal, sending to the above described second network a second request for change of the coding mode upon reception of the above described first request from the above described first network;

in the above described second network, changing the coding mode of the voice codec given to the second terminal making voice communication with the first terminal upon reception of the above described second request from the above described first terminal, and sending back to the above described first terminal a response to the above described second request; and in the above described first terminal, sending back to the above described first network a response to the above described first request.

Thus, according to the present invention, the first network connected to the first terminal having the voice codec determines that the voice coding mode is changed, and the first terminal given an instruction from the first network and the second network send and receive control signals to change the voice coding mode.

Furthermore, it is also possible to adopt a mode in which the above described communication situation is continuously monitored in the above described first network, the above described appropriate coding mode is determined depending on the change in the above described communication situation.

The communication system according to the present invention is a communication system capable of voice communication between terminals included in different networks, comprising:

a first network connected by a radio link to at least one first terminal having a first voice codec allowing any coding mode to be selected from a plurality of coding modes, monitoring the communication situation including quality of the radio link during voice communication of the above described first terminal to determine an appropriate coding mode based on the communication situation, and requesting the above described first terminal to make a change to the above described appropriate coding mode; and a second network connected to at least one second terminal capable of communicating with the above described first terminal, having at least one second voice codec allowing any coding mode to be selected from a plurality of coding modes, giving the second voice codec to the second terminal when the first terminal starts communicating with the second terminal, and changing the coding mode of the voice codec given to the second terminal communicating with the first terminal upon reception of a request for change of the coding mode from the first terminal requested to change the coding mode by the above described first network.

Furthermore, it is also possible to adopt a mode in which the above described first network continuously monitors the above described communication situation, and requests the above described first terminal to make a change to the appropriate coding mode depending on the change in the communication situation.

The communication network according to the present invention is a communication network connected to by a radio link to at least one first terminal having a voice codec allowing any coding mode to be selected from a plurality of coding modes, and also connected to another network having at least one voice codec allowing any coding mode to be selected from a plurality of coding modes to make it possible to establish communications between a second terminal given the voice codec of the above described another network and the above described first terminal, comprising:

a monitoring apparatus monitoring the communication situation including quality of the radio link during voice communication of the above described first terminal; and a control apparatus determining an appropriate coding mode based on the above described communication situation, requesting the above described first terminal to make a change to the above described appropriate coding mode, and receiving from the above described first terminal a response indicating the fact that the coding modes of the voice codec of the first terminal and the voice codec given to the second terminal communicating with the first terminal are changed to confirm that the coding modes are changed.

Furthermore, it is also possible to adopt a mode in which the above described monitoring apparatus continuously monitors the above described communication situation, and the above described control apparatus requests the above described first terminal to make a change to the appropriate coding mode depending on the change in the communication situation.

Also, the above described monitoring apparatus may be combined with the above described control apparatus as one united body.

The communication apparatus according to the present invention is a communication apparatus in a communication system connected by a radio link to at least one first terminal having a voice codec allowing any coding mode to be selected from a plurality of coding modes, and also connected to another network having at least one voice codec allowing any coding mode to be selected from a plurality of coding modes to make it possible to establish communications between a second terminal given the voice codec of the above described another network and the above described first terminal, comprising:

a monitoring unit monitoring the communication situation including quality of the radio link during voice communication of the above described first terminal; and a control unit determining an appropriate coding mode based on the above described communication situation, requesting the above described first terminal to make a change to the above described appropriate coding mode, and receiving from the above described first terminal a response indicating the fact that the coding modes of the voice codec of the first terminal and the voice codec given to the second terminal engaged in voice communication with the first terminal are changed to confirm that the coding modes are changed.

Furthermore, it is also possible to adopt a mode in which the above described monitoring unit continuously monitors the above described communication situation, and the above described control unit requests the above described first terminal to make a change to the appropriate coding mode depending on the change in the communication situation.

The communication terminal according to the present invention is a communication terminal having a voice codec allowing any coding mode to be selected from a plurality of coding modes, which is connected by a radio link to a first network monitoring the communication situation including quality of the radio link to determine a voice coding mode according to the communication situation, and is capable of communicating with another terminal given a voice codec allowing any coding mode to be selected from a plurality of coding modes by a second network interconnected with the above described first network, wherein upon request for change of the coding mode from the above described first network, the communication terminal requests the above described second network to change the coding mode and upon reception of a response indicating the fact that the coding mode of the voice codec of the above described second network is changed from the above described second network, the communication terminal changes the coding mode of the voice codec of the communication terminal and sends back the response to the above described first network.

Another communication terminal according to the present invention is a communication terminal having a voice codec allowing any coding mode to be selected from a plurality of coding modes, which is connected by a radio link to a network monitoring the communication situation including quality of the radio link to determine a voice coding mode according to the communication situation, and is capable of communicating with another terminal given a voice codec allowing any coding mode to be selected from a plurality of coding modes, wherein upon request for change of the coding mode from the above described network, the communication terminal requests the above described another terminal as a communication partner to change the coding mode and upon reception of a response indicating the fact that the coding mode is changed, the communication terminal changes the coding mode of the voice codec of the communication terminal and sends back the response to the above described network.

DETAILED DESCRIPTION OF THE PREFERRED EMBODIMENTS

One embodiment of the present invention will be described in detail with reference to the drawings.

Figure 1:
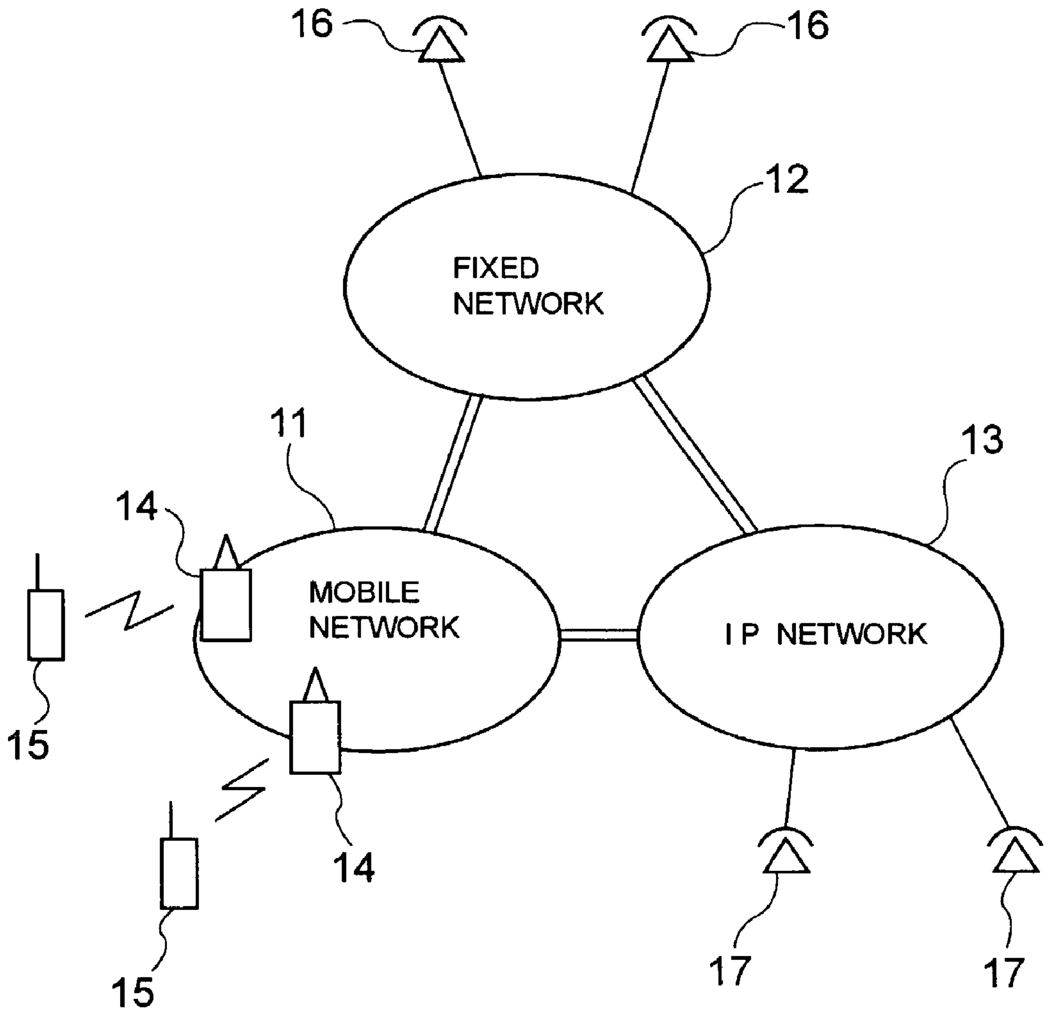
FIG. 1 is a diagram showing a configuration of a communication system according to the embodiment of the present invention.

FIG. 1 is a diagram showing a configuration of a communication system according to an embodiment of the present invention. Referring to FIG. 1, a mobile network 11 is interconnected not only with a fixed network 12 but also with an IP network 13.

The mobile network 11 is a mobile communication system constituted by a plurality of types of apparatuses including base stations 14, and is connected with mobile terminals 15 via radio links. The mobile communication system may have a variety of configurations. A signal is sent and received with a radio wave between the base station 14 and the mobile terminal 15. A fixed network 12 is for example PSTN or ISDN, and is connected with fixed telephones 16. An IP network 13 performs packet communication according to the Internet protocol, and is connected with IP telephones 17.

The base station 14 performs radio communication with a plurality of mobile terminals 15. The mobile terminal 15 can use a plurality of voice coding mode algorithms. The mobile terminal 15 can select any voice coding mode at the time of starting voice communication and change the voice coding mode to a different voice coding mode during voice communication.

Figure 2:
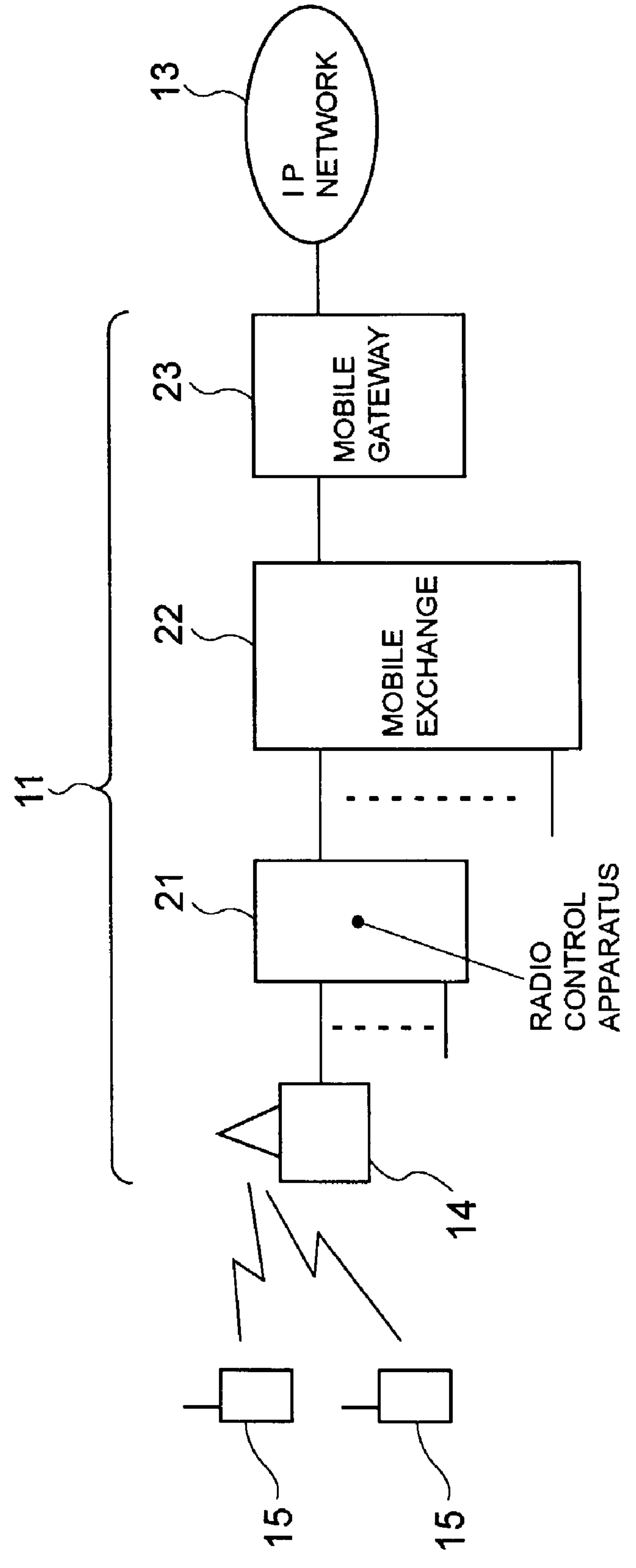
FIG. 2 is a diagram showing a configuration of a mobile communication system according to the embodiment of the present invention.

FIG. 2 is a diagram showing a configuration of the mobile communication system according to the embodiment. Referring to FIG. 2, the mobile network (mobile communication system) 11 shown in FIG. 1 has a radio control apparatus 21, a mobile exchange 22 and a mobile gateway 23 in addition to the base stations 14.

The radio control apparatus 21 is connected with a plurality of base stations 14, and controls the base stations 14 and radio links thereof. Also, the radio control apparatus 21 monitors the communication situation including communication quality of the radio link and the degree of congestion of speech channels, and determines whether the voice coding mode should be changed or not based on the information thereof. The communication quality can be determined by measuring one or more of the bit error rate, the block error rate, electric field strength, the desired wave power to (interference wave+noise) power ratio, the carrier reception power to (interference wave+noise) power ratio, and Eb/(No+Io) and Ec/(No+Io) of a received signal, for example.

If it is determined that the voice coding mode should be changed, the radio control apparatus 21 provides an instruction to the mobile terminal 15 for which the coding mode is changed. When the mobile terminal 15 is instructed to change the voice coding mode by the radio control apparatus 21, it changes the voice coding mode between itself and the IP network 13.

A plurality of mobile exchanges 22 are interconnected to constitute the network of the mobile communication system. Each mobile exchange 22 is connected with a plurality of radio control apparatuses 21.

The mobile exchange 22 may have a voice codec (not shown), although the voice codec is not used in the voice communication between the mobile terminal 15 and the IP telephone 17, but is used in the voice communication between the mobile terminal 15 and the fixed telephone 16.

The mobile gateway 23 is an inter-network connecting exchange installed between the mobile exchange 22 and the IP network 13, and relays the voice communication between the mobile terminal 15 and the IP telephone 17.

Figure 3:
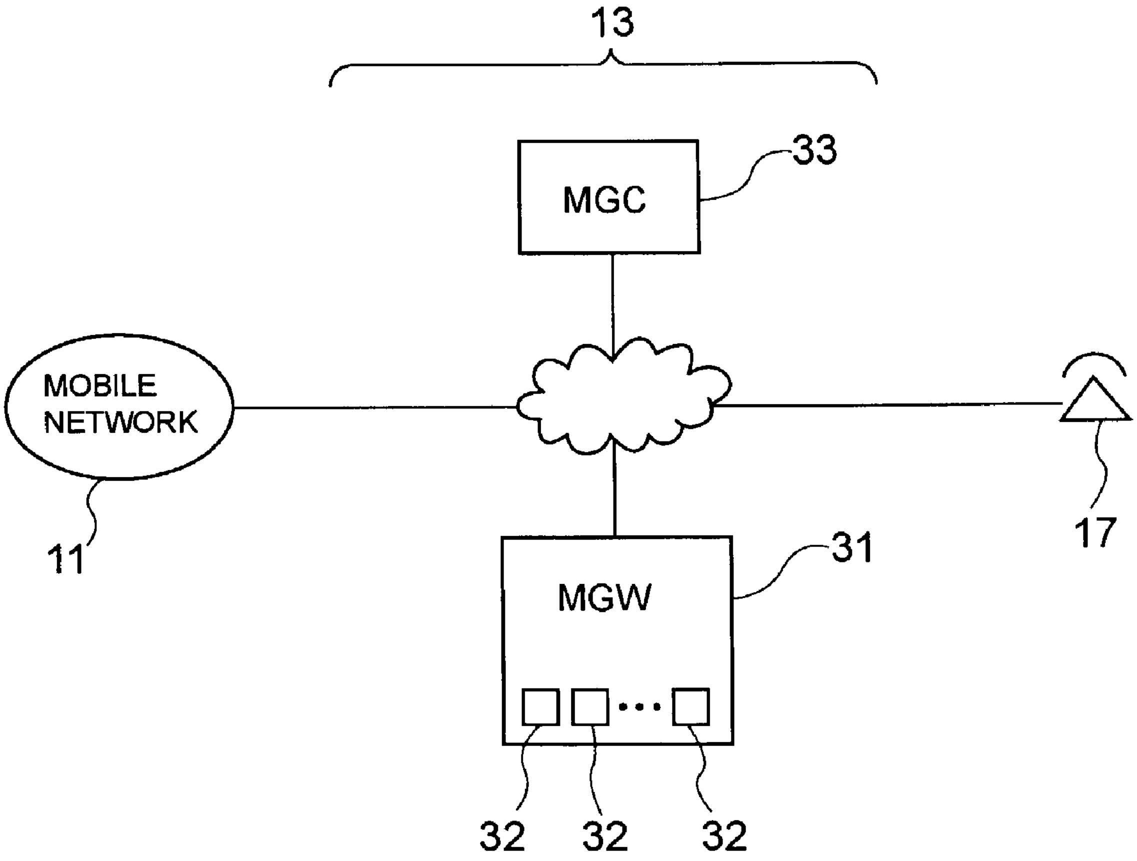
FIG. 3 is a diagram showing a configuration of an IP network according to the embodiment of the present invention.

FIG. 3 is a diagram showing a configuration of the IP network according to the embodiment. The IP network 13 is a network including a plurality of servers interconnected so that packet send/receive can be performed. Servers included in the IP network 13 include a MGW (Media Gateway) 31 and a MGC (Media Gateway Controller) 33.

The MGW 31 has a plurality of voice codecs 32 for use in the IP telephone. The voice codec 32 is assigned to the IP telephone 17 at the time when voice communication of the IP telephone is started. The voice codec 32 is compatible with algorithms of a plurality of voice coding modes. The voice coding mode between the voice codec 32 and the voice codec of the mobile terminal 15 is selected at the time when voice communication is started, and it can be changed to a different voice coding mode during the voice communication. A control signal for changing the voice coding mode in the voice codec 32 is sent with an IP packet from the mobile terminal 15 to the MGW 31 via the MGC 33, for example. Furthermore, this IP packet may be sent from the mobile terminal 15 directly to the MGW 31 without being passed through the MGC 33. In any case, the control signal of the IP packet takes a form of user data sent from the mobile terminal 15 to the MGC 33 or MGW 31 being a server of the IP network 13.

Voice signals such as PCM and ADPCM are transferred by packet communication between the MGW 31 and the IP telephone 17.

When a call from the IP telephone 17 or a call in the IP telephone 17 occurs, the MGC 33 sets a voice communication path of packet communication via the MGW 31 for using the voice codec 32. Also, when the mobile terminal 15 engaged in voice communication with the IP telephone 17 provides an instruction to change the voice coding mode, the MGC 33 instructs the MGW 31 to change the voice coding mode.

Figure 4:
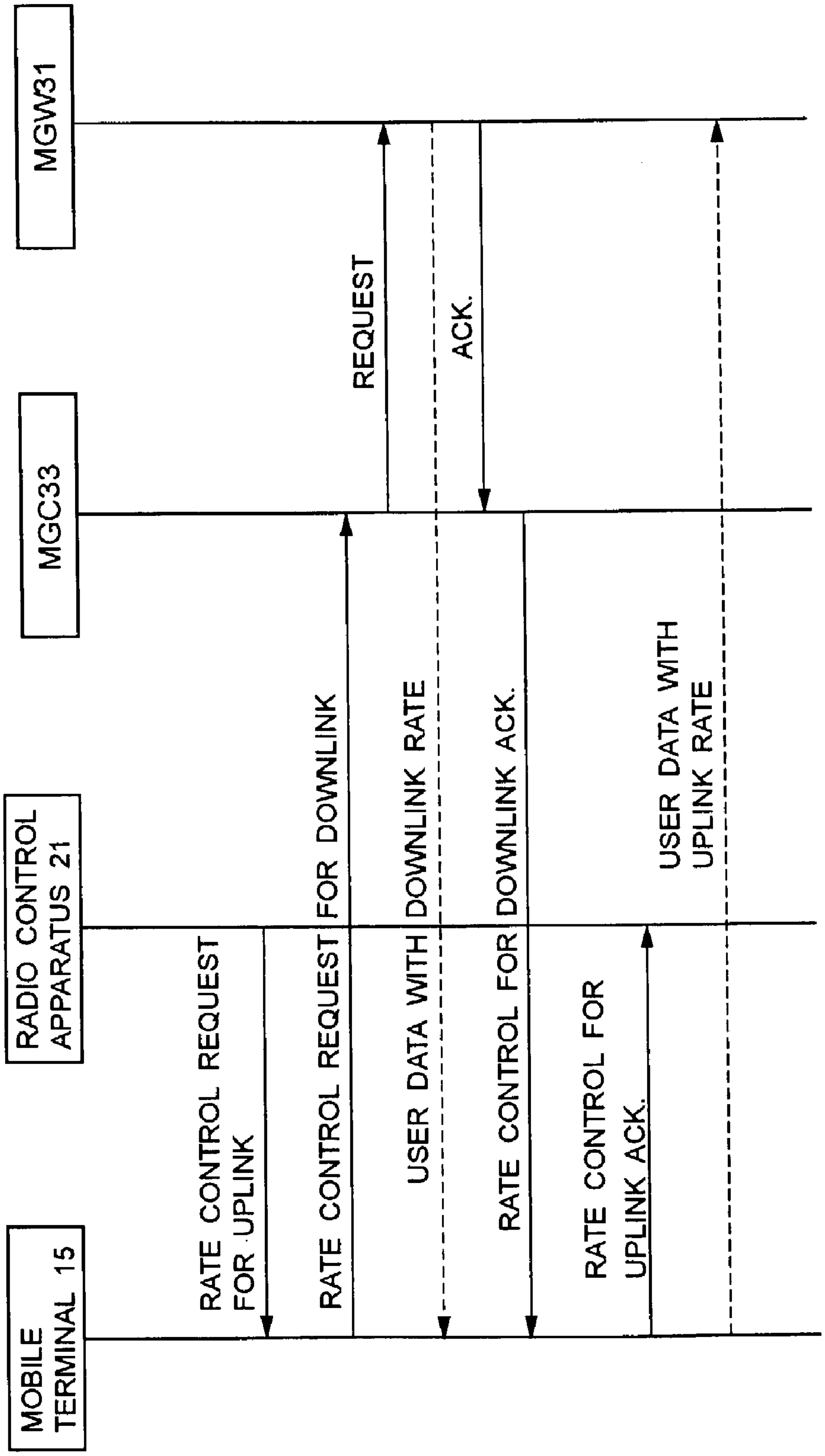
FIG. 4 is a sequence diagram showing a procedure for changing and controlling a voice coding mode in the communication system according to the embodiment of the present invention.
Figure 5:
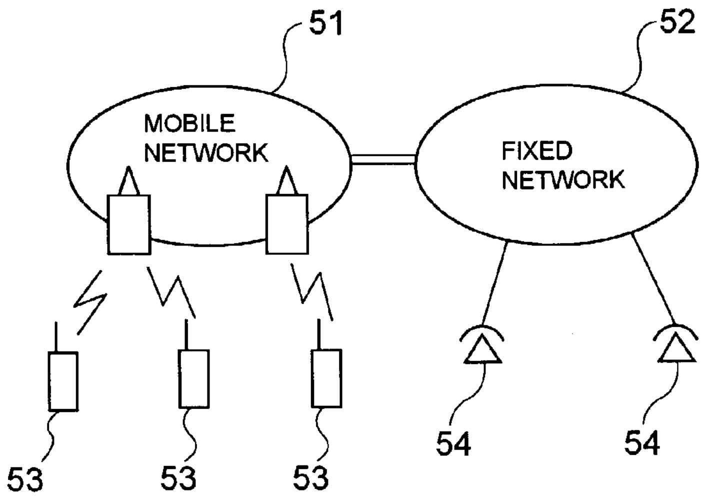
FIG. 5 is a diagram showing a configuration of a conventional general communication system.
Figure 6:
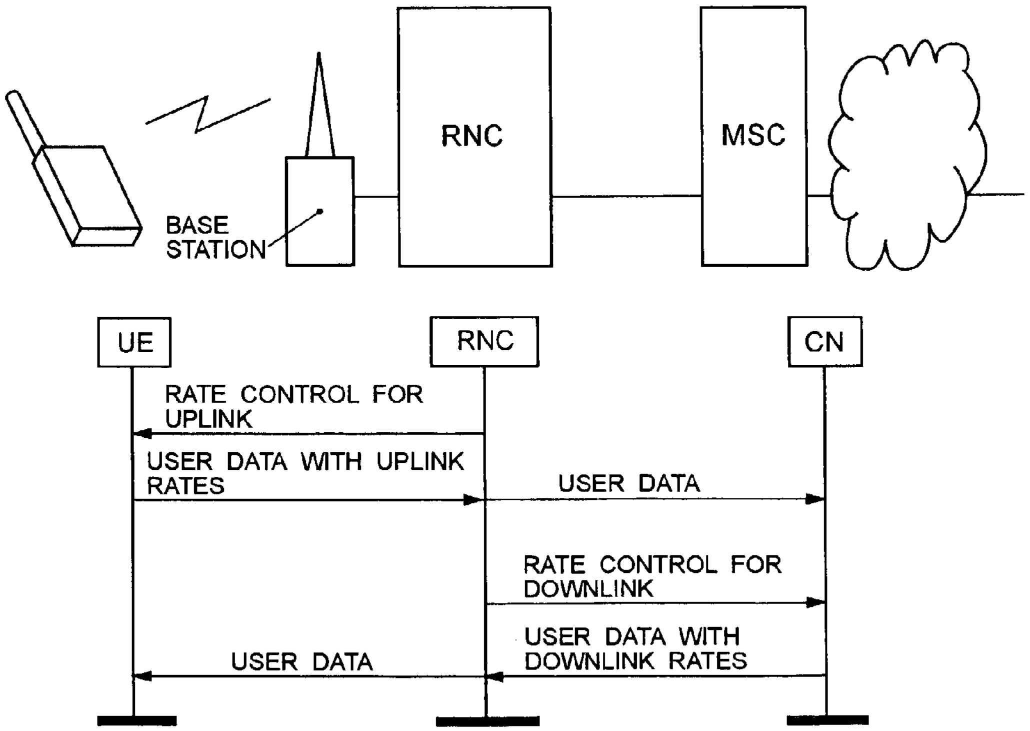
FIG. 6 is a sequence diagram showing a procedure for changing and controlling the transmission rate in the IMT-2000 system.
Figure 7:
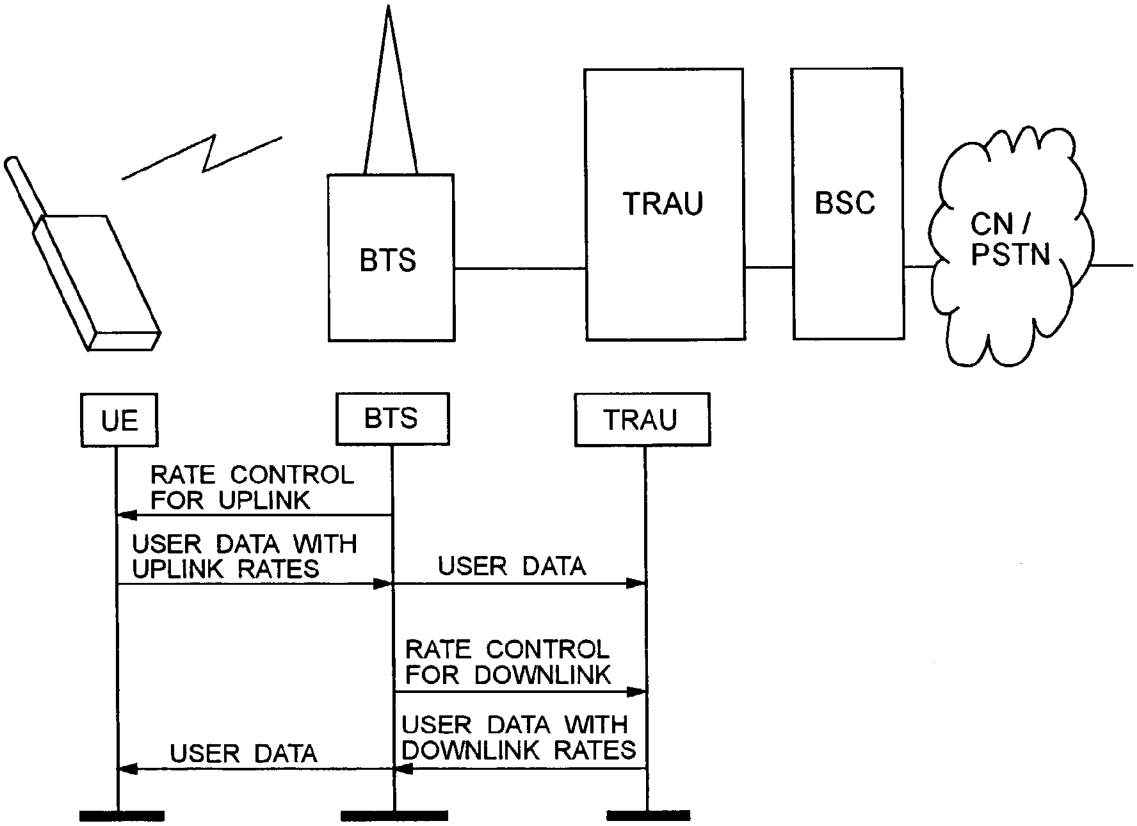
FIG. 7 is a sequence diagram showing a procedure for changing and controlling the transmission rate in the GSM system.

FIG. 4 is a sequence diagram showing a procedure for changing and controlling the voice coding mode in the communication system according to the embodiment. Referring to FIG. 4, the radio control apparatus 21 first sends to the mobile terminal 15 a control signal providing an instruction to change the voice coding mode [RATE CONTROL REQUEST FOR UPLINK] when it determines that the voice coding mode should be changed based on the quality of radio communication and the degree of congestion of the speech channels.

When the mobile terminal 15 is instructed to change the voice coding mode, it sends to the MGC 33 a control signal providing an instruction to change the voice coding mode [RATE CONTROL REQUEST FOR DOWNLINK].

When the MGC 33 is instructed to change the voice coding mode, it requests the MGW 31 to change the voice coding mode [REQUEST].

The MGW 31 requested to change the voice coding mode changes the downlink voice coding mode, and sends back to the MGC 33 a response to the request from the MGC 33 [ACK.].

The MGC 33, which receives the response from the MGW 31, sends back to the mobile terminal 15 a control signal of response to the instruction from the mobile terminal 15 [RATE CONTROL FOR DOWNLINK ACK.].

The mobile terminal 15, which receives the control signal of response, changes the uplink voice coding mode and sends back to the radio control apparatus 21 a control signal of response to the instruction from the radio control apparatus 21 [RATE CONTROL FOR UPLINK ACK.].

Furthermore, here, in the voice communication between the mobile terminal 15 and the IP telephone 17, the direction from the voice codec of the mobile terminal 15 toward the voice codec 32 of the MGW 31 is defined as the uplink, and the direction opposite thereto is defined as the downlink.

The example is shown in the embodiment in which the radio control apparatus 21 monitors communication quality and the like, and instructs the mobile terminal 15 to change the voice coding mode, but even if the base station 14 monitors communication quality and the like, and instructs the mobile terminal 15 to change the voice coding mode, the operations of the MGC 33 and the MGW 31 will not be changed. Also, the same holds true if a distinction is drawn between a monitoring apparatus and a control apparatus in such a manner that the base station 14 monitors communication quality and the like, and the radio control apparatus 21 notified of the information thereof instructs the mobile terminal 15 to change the voice coding mode. In addition, the operations of the MGC 33 and the MGW 31 will not be changed as long as it is the mobile terminal 15 that instructs the IP network 13 to change the voice coding mode regardless of configuration of the mobile network 11.

Thus, according to the communication system of the embodiment, the mobile terminal 15 instructed to change the voice coding mode by the radio control apparatus 21 and the MGC 33 or the MGW 31 send and receive control signals with an IP packet, whereby the voice coding mode is changed, and therefore it is not necessary to define a control protocol between networks in which an apparatus terminating the control protocol is changed depending on the configuration of the mobile network for changing the voice coding mode, thus making it possible to achieve commonality of the operations of the MGC 33 and the MGW 31 regardless of configuration of the mobile network.

Also, when the MGC 33 and the MGW 31 are rendered connectable to a plurality of different mobile networks, the MGC 33 and the MGW 31 do not need to have different control protocols for each mobile network.

Furthermore, in the embodiment, the case is illustrated where the voice coding mode is changed between the mobile terminal 15 and the MGC 33 and MGW 31 in the voice communication between the mobile terminal 15 connected to the mobile network 11 and the IP telephone 17 connected to the IP network 13, but the voice coding mode may similarly be changed between the mobile terminals 15 in the voice communication between the mobile terminals 15. In this case, the control signals may be sent and received between the mobile terminals 15.

According to the present invention, a first network connected to a first terminal having a voice codec determines that the voice coding mode is changed, and the first terminal instructed to change the voice coding mode by the first network and a second network send and receive control signals to change the voice coding mode, and therefore the partner to which the second network sends the control signal and from which it receives the control signal is always the first terminal, thus making it possible to change the voice coding mode by an operation independent of the configuration of the first network.

Also, when the second network is rendered connectable to a plurality of first networks, the second network does not need to have a different control protocol for each first network.

What is claimed is:

1. A method for changing a voice coding mode in a communication system including first and second networks interconnected with each other, at least one first terminal having a voice codec allowing any voice coding mode to be selected from a plurality of voice coding modes, and connected to said first network by a radio link, and at least one second terminal connected to said second network and given by said second network a voice codec allowing any voice coding mode to be selected from a plurality of voice coding modes to communicate with said first terminal, comprising the steps for:

in said first network, monitoring the communication situation including quality of the radio link during voice communication of said first terminal;

determining an appropriate voice coding mode based on said communication situation; and sending to said first terminal a first request for change to said appropriate voice coding mode;

in said first terminal, sending to said second network a second request for change of the voice coding mode upon reception of said first request from said first network;

in said second network, changing the voice coding mode of the voice codec given to said second terminal making voice communication with said first terminal upon reception of said second request from said first terminal, and sending back to said first terminal a response to said second request; and in said first terminal, sending back to said first network a response to said first request.

2. The method for changing a voice coding mode according to claim 1, wherein said communication situation is continuously monitored in said first network, said appropriate voice coding mode is determined depending on the change in said communication situation.

3. A communication system capable of voice communication between terminals included in different networks, comprising:

a first network connected by a radio link to at least one first terminal having a first voice codec allowing any coding mode to be selected from a plurality of coding modes, monitoring the communication situation including quality of the radio link during voice communication of said first terminal to determine an appropriate coding mode based on the communication situation, and requesting said first terminal to make a change to said appropriate coding mode; and a second network connected to at least one second terminal capable of communicating with said first terminal, having at least one second voice codec allowing any coding mode to be selected from a plurality of coding modes, giving said second voice codec to said second terminal when said first terminal starts communicating with said second terminal, and changing the coding mode of said second voice codec given to said second terminal communicating with said first terminal upon reception of a request for change of the coding mode from the first terminal requested to change the coding mode by said first network.

4. The communication system according to claim 3, wherein said first network continuously monitors said communication situation, and requests said first terminal to make a change to the appropriate coding mode depending on the change in the communication situation.

5. A communication network connected to by a radio link to at least one first terminal having a voice codec allowing any coding mode to be selected from a plurality of coding modes, and also connected to another network having at least one voice codec allowing any coding mode to be selected from a plurality of coding modes to make it possible to establish communications between a second terminal given the voice codec of said another network and said first terminal, comprising:

a monitoring apparatus monitoring the communication situation including quality of the radio link during voice communication of said first terminal; and a control apparatus determining an appropriate coding mode based on said communication situation, requesting said first terminal to make a change to said appropriate coding mode, and receiving from said first terminal a response indicating the fact that the coding modes of the voice codec of the first terminal and the voice codec given to the second terminal communicating with the first terminal are changed to confirm that the coding modes are changed.

6. The communication network according to claim 5, wherein said monitoring apparatus continuously monitors said communication situation, and said control apparatus requests said first terminal to make a change to the appropriate coding mode depending on the change in the communication situation.

7. The communication network according to claim 5, wherein said monitoring apparatus is combined with said control apparatus as one united body.

8. A communication apparatus in a communication system connected by a radio link to at least one first terminal having a voice codec allowing any coding mode to be selected from a plurality of coding modes, and also connected to another network having at least one voice codec allowing any coding mode to be selected from a plurality of coding modes to make it possible to establish communications between a second terminal given the voice codec of said another network and said first terminal, comprising:

a monitoring unit monitoring the communication situation including quality of the radio link during voice communication of said first terminal; and a control unit determining an appropriate coding mode based on said communication situation, requesting said first terminal to make a change to said appropriate coding mode, and receiving from said first terminal a response indicating the fact that the coding modes of the voice codec of the first terminal and the voice codec given to the second terminal engaged in voice communication with the first terminal are changed to confirm that the coding modes are changed.

9. The communication apparatus according to claim 8, wherein said monitoring unit continuously monitors said communication situation, and said control unit requests said first terminal to make a change to the appropriate coding mode depending on the change in the communication situation.

10. A communication terminal having a voice codec allowing any coding mode to be selected from a plurality of coding modes, which is connected by a radio link to a first network monitoring the communication situation including quality of the radio link to determine a coding mode according to the communication situation, and is capable of communicating with another terminal given a voice codec allowing any coding mode to be selected from a plurality of coding modes by a second network interconnected with said first network, wherein upon request for change of the coding mode from said first network, the communication terminal requests said second network to change the coding mode and upon reception of a response indicating the fact that the coding mode of the voice codec of said second network is changed from said second network, the communication terminal changes the coding mode of the voice codec of the communication terminal and sends back the response to said first network.

11. A communication terminal having a voice codec allowing any coding mode to be selected from a plurality of coding modes, which is connected by a radio link to a network monitoring the communication situation including quality of the radio link to determine a coding mode according to the communication situation, and is capable of communicating with another terminal given a voice codec allowing any coding mode to be selected from a plurality of coding modes, wherein upon request for change of the coding mode from said network, the communication terminal requests said another terminal as a communication partner to change the coding mode and upon reception of a response indicating the fact that the coding mode is changed, the communication terminal changes the coding mode of the voice codec of the communication terminal and sends back the response to said network.

* * * * *